US012613809B2

(12) United States Patent (10) Patent No.: US 12,613,809 B2

Guan et al. (45) Date of Patent: Apr. 28, 2026

(54) COMPUTER SYSTEM AND METHOD FOR SYSTEM MEMORY ENCRYPTION AND DECRYPTION

(71) Applicant: Shanghai Zhaoxin Semiconductor Co., Ltd., Shanghai (CN)

(72) Inventors: Yingbing Guan, Shanghai (CN); Weilin Wang, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 14 days.

(21) Appl. No.: 18/829,648

(22) Filed: Sep. 10, 2024

(65) Prior Publication Data

US 2025/0130956 A1 Apr. 24, 2025

(30) Foreign Application Priority Data

Oct. 24, 2023 (CN) .......................... 202311387880.8

(51) Int. Cl.
| | |
|---|---|
| *G06F 12/14* | (2006.01) |
| *H04L 9/08* | (2006.01) |
| *H04L 9/14* | (2006.01) |

(52) U.S. Cl.
CPC ........ G06F 12/1408 (2013.01); H04L 9/0869 (2013.01); H04L 9/14 (2013.01)

(58) Field of Classification Search
CPC .. G06F 12/1408; G06F 21/602; G06F 9/5016; G06F 21/64; G06F 21/79; H04L 9/0869; H04L 9/14; H04L 9/0894; G11C 11/401
See application file for complete search history.

(56) References Cited

U.S. PATENT DOCUMENTS

| | | | | |
|---|---|---|---|---|
| 9,405,508 B2 * | 8/2016 | Karras | ...................... | G06F 7/24 |
| 9,419,951 B1 * | 8/2016 | Felsher | ................. | H04L 9/3249 |
| 11,455,257 B2 | 9/2022 | Gopal | | |
| 2003/0093686 A1 | 5/2003 | Barnes | | |
| 2010/0281273 A1 | 11/2010 | Lee | | |
| 2014/0047181 A1 | 2/2014 | Peterson | | |
| 2015/0095576 A1 | 4/2015 | Subrahmanyam | | |
| 2015/0100753 A1 | 4/2015 | Shen | | |

(Continued)

FOREIGN PATENT DOCUMENTS

| | | |
|---|---|---|
| CN | 112583583 A | 3/2021 |
| CN | 108123800 B | 6/2021 |
| CN | 114357485 A | 1/2022 |

OTHER PUBLICATIONS

Non-Final Office Action issued in U.S. Appl. No. 18/829,677, filed Sep. 10, 2024, mailed Nov. 24, 2025.

(Continued)

*Primary Examiner* — Sm A Rahman

(74) *Attorney, Agent, or Firm* — McClure, Qualey & Rodack, LLP

(57) ABSTRACT

A computer system with data encryption and decryption on system memory is shown. The computer system has a system memory storing data, and a processor coupled to the system memory. The processor has key registers storing multiple keys. Based on the access address on the system memory, the processor selects a target key from the key registers, to apply the target key to perform data encryption and decryption on the system memory.

14 Claims, 4 Drawing Sheets

(56) References Cited

U.S. PATENT DOCUMENTS

| | | | |
|---|---|---|---|
| 2015/0143055 A1 | 5/2015 | Guthrie | |
| 2015/0261615 A1 | 9/2015 | Peterson | |
| 2018/0011802 A1 | 1/2018 | Ndu | |
| 2018/0067866 A1 | 3/2018 | Shanbhogue | |
| 2019/0042402 A1 | 2/2019 | Chhabra | |
| 2019/0102323 A1 | 4/2019 | Durham | |
| 2019/0102577 A1 | 4/2019 | Gueron | |
| 2019/0236022 A1 | 8/2019 | Gopal | |
| 2020/0007332 A1 | 1/2020 | Girkar | |
| 2020/0134208 A1 | 4/2020 | Pappachan | |
| 2020/0201787 A1 | 6/2020 | Shanbhogue | |
| 2020/0409868 A1 | 12/2020 | Durham | |
| 2021/0006395 A1 | 1/2021 | Durham | |
| 2021/0083858 A1 | 3/2021 | Jaquette | |
| 2021/0089471 A1 | 3/2021 | Lu | |
| 2021/0150040 A1* | 5/2021 | Durham | G06F 9/30145 |
| 2021/0200879 A1 | 7/2021 | Gerzon | |
| 2021/0211281 A1* | 7/2021 | Park | G06F 21/87 |
| 2021/0266143 A1* | 8/2021 | Boue | H04L 9/003 |
| 2021/0303469 A1 | 9/2021 | Lu | |
| 2022/0100871 A1 | 3/2022 | Huntley | |
| 2022/0100911 A1* | 3/2022 | Trikalinou | G06F 12/145 |
| 2022/0138329 A1* | 5/2022 | Kounavis | G06F 21/602 |
| | | | 713/190 |
| 2022/0206958 A1 | 6/2022 | LeMay | |
| 2022/0284135 A1 | 9/2022 | Hubis | |
| 2023/0018585 A1 | 1/2023 | Liljestrand | |
| 2023/0101226 A1 | 3/2023 | Feghali | |
| 2024/0054080 A1 | 2/2024 | LeMay | |
| 2024/0333501 A1 | 10/2024 | Durham | |
| 2025/0286715 A1 | 9/2025 | Carr | |

OTHER PUBLICATIONS

Non-Final Office Action issued in U.S. Appl. No. 18/829,663, filed Sep. 10, 2024, mailed Dec. 18, 2025.

Bellovin; A modem look at telegraph codebooks; 2025; retrieved from the Internet https://www.cs.columbia.edu/~smb/papers/codebooks. pdf; pp. 1-39, as printed. (Year: 2025).

* cited by examiner

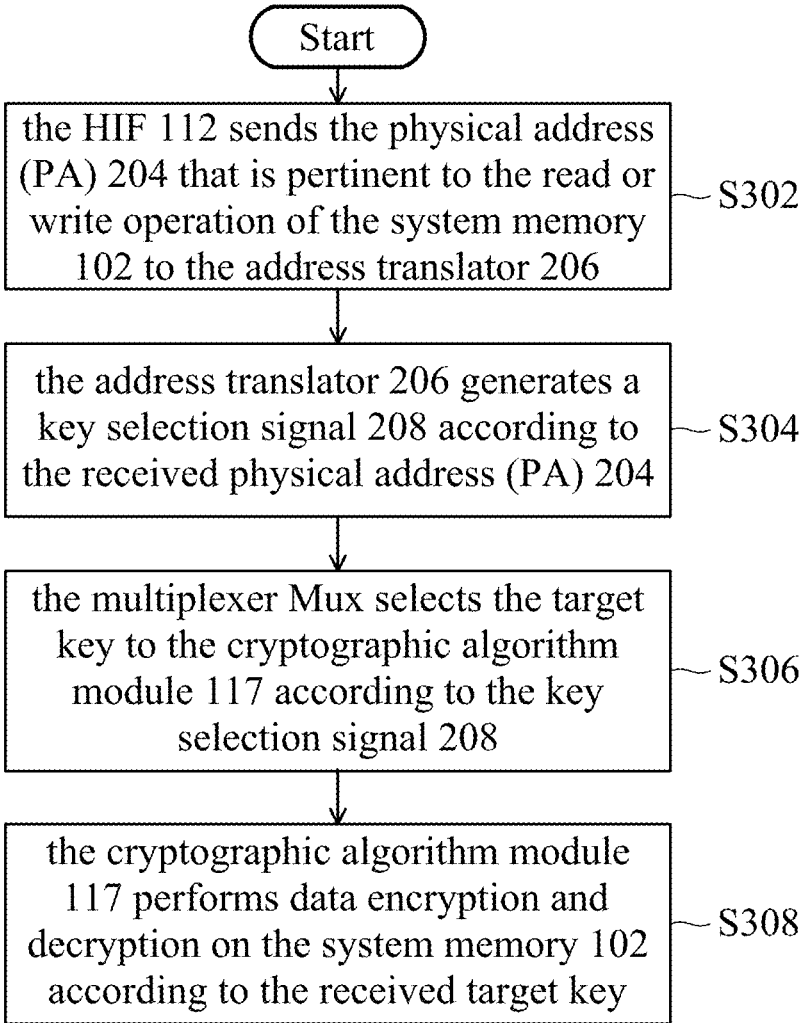

Start the HIF 112 sends the physical address (PA) 204 that is pertinent to the read or write operation of the system memory 102 to the address translator 206 — S302 the address translator 206 generates a key selection signal 208 according to the received physical address (PA) 204 — S304 the multiplexer Mux selects the target key to the cryptographic algorithm module 117 according to the key selection signal 208 — S306 the cryptographic algorithm module 117 performs data encryption and decryption on the system memory 102 according to the received target key — S308

FIG. 3 a target key is selected from a plurality of keys based on an access address on the system memory ─ S402 apply the selected target key to encrypt the write data or decrypt the read data to write or read the system memory ─ S404

COMPUTER SYSTEM AND METHOD FOR SYSTEM MEMORY ENCRYPTION AND DECRYPTION

CROSS REFERENCE TO RELATED APPLICATIONS

This application claims priority of China Patent Application No. 202311387880.8, filed on Oct. 24, 2023, the entirety of which is incorporated by reference herein.

BACKGROUND OF THE DISCLOSURE

Field of the Disclosure

The present disclosure relates to processors, and, in particular, to processors capable of data encryption and decryption on system memory.

Description of the Related Art

Common system memories in computer systems include dynamic random-access memory (DRAM), non-volatile random access memory (NVRAM), and others. Hackers may attack the system memory and obtain data from it. In particular, NVRAM retains data even if its power is interrupted. Serious security issues may occur if plaintext is stored in the system memory.

How to improve the security of data stored in the system memory of a computer system is an important issue in this technical field.

BRIEF SUMMARY OF THE DISCLOSURE

A memory encryption and decryption technology (MET) is shown. In particular, in the disclosure, the keys applied to the data encryption and decryption on the system memory are selected according the system memory's address.

A computer system in accordance with an exemplary embodiment of the disclosure includes a system memory storing data, and a processor coupled to the system memory. The processor includes key registers storing a plurality of keys. The processor selects a target key from the key registers based on an access address on the system memory, to apply the target key to perform data encryption and decryption on the system memory.

Based on the aforementioned concept, a method for system memory encryption and decryption is shown, which includes: selecting a target key from a plurality of keys based on an access address on a system memory; and applying the target key to perform data encryption and decryption on the system memory.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein:

FIG. 3 further illustrates the key supply process of the processor 100 in FIG. 2.

DETAILED DESCRIPTION OF THE DISCLOSURE

Figure 1:
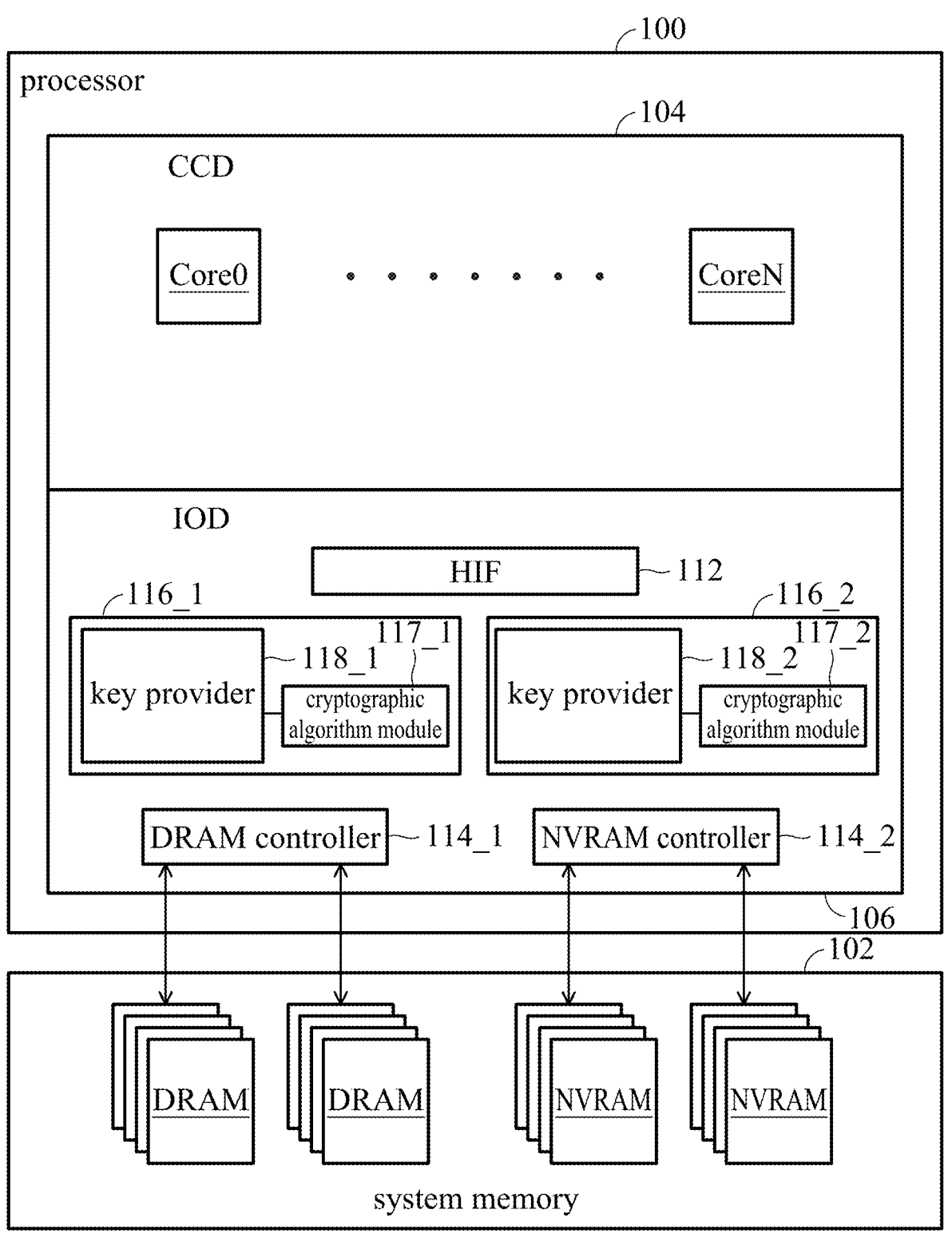
FIG. 1 illustrates a processor 100 coupled to a system memory 102 in accordance with an exemplary embodiment of the disclosure.

The following description lists various embodiments of the present disclosure, but is not intended to limit thereto. The actual scope of the disclosure should be defined according to the scope of the application. The various units, modules, or functional blocks mentioned below may be implemented by a combination of hardware, software, and firmware, and may also include special circuits. Various units or functional blocks are not limited to being implemented separately, but may also be combined together to share certain functions.

This disclosure proposes a memory encryption/decryption technology (MET) for the system memory. In particular, in the disclosure, the keys applied to the data encryption and decryption on the system memory are selected according the system memory's address.

In an exemplary embodiment, two keys are provided. The encryption and decryption engine selects a target key from the two keys according to a specific address bit of an access address on the system memory. In an exemplary embodiment, two keys corresponding to the different states of the $13_{th}$ bit of the memory address are provided. Thus, every 4 KB of data, the two keys are alternately selected as the target key for data encryption and decryption. When the value of the $13_{th}$ bit of the memory address is 0, a first key is used to encrypt and decrypt data. When the value of the $13_{th}$ bit of the memory address is 1, a second key is used to encrypt and decrypt data. In this way, the data in the entire system memory is encrypted and decrypted by two different keys alternately.

In some exemplary embodiments, there are a larger number of keys. This type of implementation uses more bits of the memory address as the basis for key selection. For example, the $13_{th}$ and $14_{th}$ bits of the memory address are used for key selection; and, in this embodiment, four keys corresponding to the different values of the $13_{th}$ and $14_{th}$ bits of the memory address are used to encrypt and decrypt data. In an exemplary embodiment, N (an integer greater than 1) bits of the memory address are used as the basis for key selection, and $2^N$ keys corresponding to the different values of the N bits are used to encrypt and decrypt data.

In another implementation, the key selection is based on a hash value calculation performed on the memory address. First, the particular N bits of the memory address is transformed into an M-bit hash value by the hash value calculation, where N is an integer greater than 2 and M is an integer greater than 1. Then, Z bits (an integer greater than 1 and less than or equal to M) of the generated hash value are used as the basis for key selection. In this embodiment, $2^Z$ keys are selected based on the memory address for data encryption and decryption.

Data encryption and decryption with the multiple keys may be achieved by hardware. The multiple keys may be stored in the internal registers of the hardware, to be selected according to the memory address for data encryption/decryption. Since the software cannot know the keys stored in the internal registers of the hardware, nor can it know which data in the system memory are encrypted by the same key, the encryption design in this disclosure is very secure.

FIG. 1 illustrates a processor 100 coupled to a system memory 102 in accordance with an exemplary embodiment of the disclosure. The system memory 102 includes a dynamic random access memory (DRAM) and non-volatile random access memory (NVRAM). The processor 100 encrypts data before writing it into the system memory 102, and decrypts data read from the system memory 102.

As shown in FIG. 1, the processor 100 includes a core compute die (abbreviated as CCD) 104, and an input and output die (e.g., I/O die, abbreviated as IOD) 106. The CCD 104 includes a plurality of cores Core0~CoreN. The IOD 106 communicates with the cores Core0~CoreN through a host interconnection fabric (HIF) 112.

To read and write the DRAM of the system memory 102, the IOD 106 provides a DRAM controller 114_1 and an encryption and decryption engine 116_1. The encryption and decryption engine 116_1 includes a cryptographic algorithm module 117_1 and a key provider 118_1. Through the HIF 112, the core Core0~CoreN instruct the DRAM controller 114_1 to read/write the DRAM, and operate the encryption and decryption engine 116_1 to encrypt the write data and to decrypt the read data. In the encryption and decryption engine 116_1, the key provider 118_1 provides the keys to the cryptographic algorithm module 117_1 for encryption/decryption of data. In particular, as mentioned above, the key provider 118_1 outputs the target key based on the DRAM address of the read/write data. It's not to use a uniform key in the overall DRAM. The keys to be selected corresponding to the read/write DRAM address are securely protected within the hardware without being exposed to the running software. Data security is significantly improved.

A similar design may also be used in the read and write of the NVRAM of the system memory 102. To read and write the NVRAM of the system memory 102, the IOD 106 provides an NVRAM controller 114_2 and an encryption and decryption engine 116_2. The encryption and decryption engine 116_2 includes a cryptographic algorithm module 117_2 and a key provider 118_2. Through the HIF 112, the core Core0~CoreN instruct the NVRAM controller 114_2 to read/write the NVRAM, and operate the encryption and decryption engine 116_2 to encrypt the write data and to decrypt the read data. In the encryption and decryption engine 116_2, the key provider 118_2 obtains the keys from a non-volatile area of a memory, and supplies the obtained keys to the cryptographic algorithm module 117_2 for encryption/decryption of data. In particular, as mentioned above, the key provider 118_2 provides the target key based on the NVRAM address of the read/write data. It's not to use a uniform key in the overall NVRAM. The keys to be selected corresponding to the read/write NVRAM address are securely protected within the hardware without being exposed to the running software. Data security is significantly improved.

In an exemplary embodiment, the keys supplied by key provider 118_2 may be completely different from the keys supplied by key provider 118_1. For example, the first key and the second key provided by the key provider 118_1 corresponding to the DRAM address may be completely different from the third key and the fourth key provided by the key provider 118_2 corresponding to the NVRAM address.

In addition, unlike FIG. 1, which uses two dies to implement the processor 100, another implementation is to combine the CCD 104 and the IOD 106 into a single die. This implementation can make the cores Core0~CoreN to communicate with the DRAM/NVRAM controller at a higher speed.

In this disclosure, some model-specific registers (MSRs) are defined in the implementation of the above encryption and decryption technology. The Instruction Set Architecture (ISA) may define the following MSRs:

SMED_CAPABILITY: indicating the supported encryption and decryption capabilities;

SMED_ACTIVATE: to enable/disable the encryption and decryption capabilities separately; and SMED_EXCLUDE_MASK, and SMED_EXCLUDE_BASE: specifying an encryption-free and decryption-free zone, such as an address range of the system memory 102 allocated for a memory mapping input/output (MMIO) technology, an address range of the system memory 102 allocated for configuration information (e.g., an address range to configure the DRAM controller DRAMC), or an address range of the system memory 102 allocated for building a Basic Input Output System (BIOS). These ranges are not suitable for encryption.

When the processor 100 activates the encryption and decryption function of the system memory 102, it may use a CPUID instruction to list the existence of the above MSRs and list their addresses. The above MSRs may be configured by the BIOS executed in the system booting-up procedure. The above MSRs may be provided within the cores (for example, Core0, Core1 . . . , etc.). In another exemplary embodiment, the MSRs are provided within the HIF 112 and/or the encryption and decryption engines 116_1 and 116_2, to be accessed by the cores.

When the BIOS configures the MSRs, the microcode unit (ucode) may transfer the contents of the MSRs SMED_EXCLUDE_MASK, and SMED_EXCLUDE_BASE to the HIF 112. When a core of Core0~CoreN issues a data read/write request, the HIF 112 may check the MSRs SMED_EXCLUDE_MASK and SMED_EXCLUDE_BASE to determine whether the access target is an encryption-free and decryption-free zone. The specific judgment manner will be described in detail later.

In an exemplary embodiment, the MSR SMED_CAPABILITY may have the following design.

The first bit (for example, bit 0), the second bit (for example, bit 1), and the third bit (for example, bit 2) of the MSR SMED_CAPABILITY respectively show whether to support an AES-XTS 128-bit cryptographic algorithm (wherein AES is abbreviated from advanced encryption standard), an AES-XTS 256-bit cryptographic algorithm, and an SM4 block cryptographic algorithm. More candidates for cryptographic algorithm may be marked here. In an exemplary embodiment, when the first bit of the MSR SMED_CAPABILITY is 1, it indicates that the AES-XTS 128-bit cryptographic algorithm is supported, otherwise, it indicates that the AES-XTS 128-bit cryptographic algorithm is not supported. When the second bit of the MSR SMED_CAPABILITY is 1, it indicates that the AES-XTS 256-bit cryptographic algorithm is supported, otherwise, it indicates that the AES-XTS 256-bit cryptographic algorithm is not supported. When the third bit of the MSR SMED_CAPABILITY is 1, it indicates that the SM4 block cryptographic algorithm is supported, otherwise, it indicates that the SM4 block cryptographic algorithm is not supported. In the other exemplary embodiments, the other XTS-mode cryptographic algorithms, or the other modes (such as ECB, CBC, CFB, OFB, CTR modes, and so on) of cryptographic algorithms are supported. It does not intend to limit the cryptographic algorithm nor its operation modes.

The fourth bit (for example, bit 4) of the MSR SMED_CAPABILITY may be used to indicate whether the proposed key technology (providing the target key based on the access address on the system memory) is supported or not. In an exemplary embodiment, when the value of the fourth bit of the MSR SMED_CAPABILITY is 1, it indicates that the proposed key technology is supported; otherwise, it indicates that the proposed key technology is not supported.

The sixth bit (for example, bit 6) of the MSR SMED_CAPABILITY may be used to show whether to support the MSRs SMED_EXCLUDE_MASK and SMED_EXCLUDE_BASE for setting the encryption-free and decryption-free zone. In an exemplary embodiment, when the sixth bit of the MSR SMED_CAPABILITY is 1, it indicates that the MSRs SMED_EXCLUDE_MASK and SMED_EXCLUDE_BASE for setting the encryption-free and decryption-free zone are supported; otherwise, when the value is 0, it means that the encryption-free and decryption-free zone is not supported.

The following discusses the MSR SMED_ACTIVATE.

In an exemplary embodiment, the MSR SMED_ACTIVATE may have the following design.

The first bit (such as bit 0) of the MSR SMED_ACTIVATE shows whether to lock the MSR SMED_ACTIVATE or not. If the MSR SMED_ACTIVATE is locked, the MSRs SMED_EXCLUDE_MASK and SMED_EXCLUDE_BASE for setting the encryption-free and decryption-free zone are protected from being changed. When being locked, the all fields of the MSRs SMED_ACTIVATE, SMED_EXCLUDE_MASK, and SMED_EXCLUDE_BASE are no longer modified.

The second bit (for example, bit 1) of the MSR SMED_ACTIVATE indicates whether to enable the hardware to perform data encryption and decryption on the system memory 102. In an exemplary embodiment, when the value of the second bit of the MSR SMED_ACTIVATE is 1, it means that the hardware is enabled to perform data encryption and decryption on the system memory 102; otherwise, when the value is 0, it means that the hardware is disabled from performing data encryption and decryption on the system memory 102.

The first sector (for example, bit [7:4]) of the MSR SMED_ACTIVATE is used to select a cryptographic algorithm from the cryptographic algorithms presented in the MSR SMED_CAPABILITY. In an exemplary embodiment, when the first sector is a first value (for example, 0000), it means that the AES-XTS 128-bit cryptographic algorithm is selected. When the first sector is the second value (for example, 0001), it means that the AES-XTS 256-bit cryptographic algorithm is selected. When the first sector is the third value (for example, 0010), it means that the SM4 block cryptographic algorithm is selected. In another exemplary embodiment, the enable values are changed. When the first sector is a first value (for example, the value 0001), it means that the AES-XTS 128-bit cryptographic algorithm is selected. When the first sector is the second value (for example, 0010), it means that the AES-XTS 256-bit cryptographic algorithm is selected. When the first sector is the third value (for example, the value 0100), it means that the SM4 block cryptographic algorithm is selected.

The following discusses the design of the MSRs SMED_EXCLUDE_MASK and SMED_EXCLUDE_BASE.

In an exemplary embodiment, the MSR SMED_EXCLUDE_MASK may have the following design.

The first bit (for example, bit 11) of the MSR SMED_EXCLUDE_MASK is used to indicate whether the MSR SMED_EXCLUDE_MASK and its related MSR SMED_EXCLUDE_BASE are combined for determination, such as to determine whether an access address falls within the encryption-free and decryption-free zone. In an exemplary embodiment, when the first bit of the MSR SMED_EXCLUDE_MASK is 1, it means that the MSR SMED_EXCLUDE_MASK and its related MSR SMED_EXCLUDE_BASE are combined to determine whether a requested address belongs to the encryption-free and decryption-free zone; otherwise, there is no need to check whether the access address belongs to the encryption-free and decryption-free zone or not.

In an exemplary implementation, the bits [MaxPhysADDR-1:12] of the MSR SMED_EXCLUDE_MASK are used to define a mask for the encryption-free and decryption-free zone. MaxPhysADDR is the maximum bit of a physical address. The bits [MaxPhysADDR-1:12] of the MSRSMED_EXCLUDE_BASE are used to indicate the base address of the encryption-free and decryption-free zone. According to the mask obtained from SMED_EXCLUDE_MASK and the base address obtained from SMED_EXCLUDE_BASE, the HIF 112 may determine whether an access address falls into the encryption-free and decryption-free zone. In an exemplary embodiment, the HIF 112 determines whether the address ADDR of the write data or the read data belongs to the encryption-free and decryption-free zone by: combining the address ADDR with the mask obtained from the MSR SMED_EXCLUDE_MASK by a bitwise AND operation, to generate a first calculation result; performing a bitwise AND operation on the base address obtained from the MSR SMED_EXCLUDE_BASE and the mask obtained from the MSR SMED_EXCLUDE_MASK, to generate the second calculation result; and comparing the first calculation result with the second calculation result. If the first calculation result and the second calculation result are the same, it means that the address ADDR falls into the encryption-free and decryption-free zone; otherwise, it means that the address ADDR does not fall into the encryption-free and decryption-free zone.

Based on the above settings of the MSRs, data encryption and decryption are performed on the system memory 102.

Figure 2:
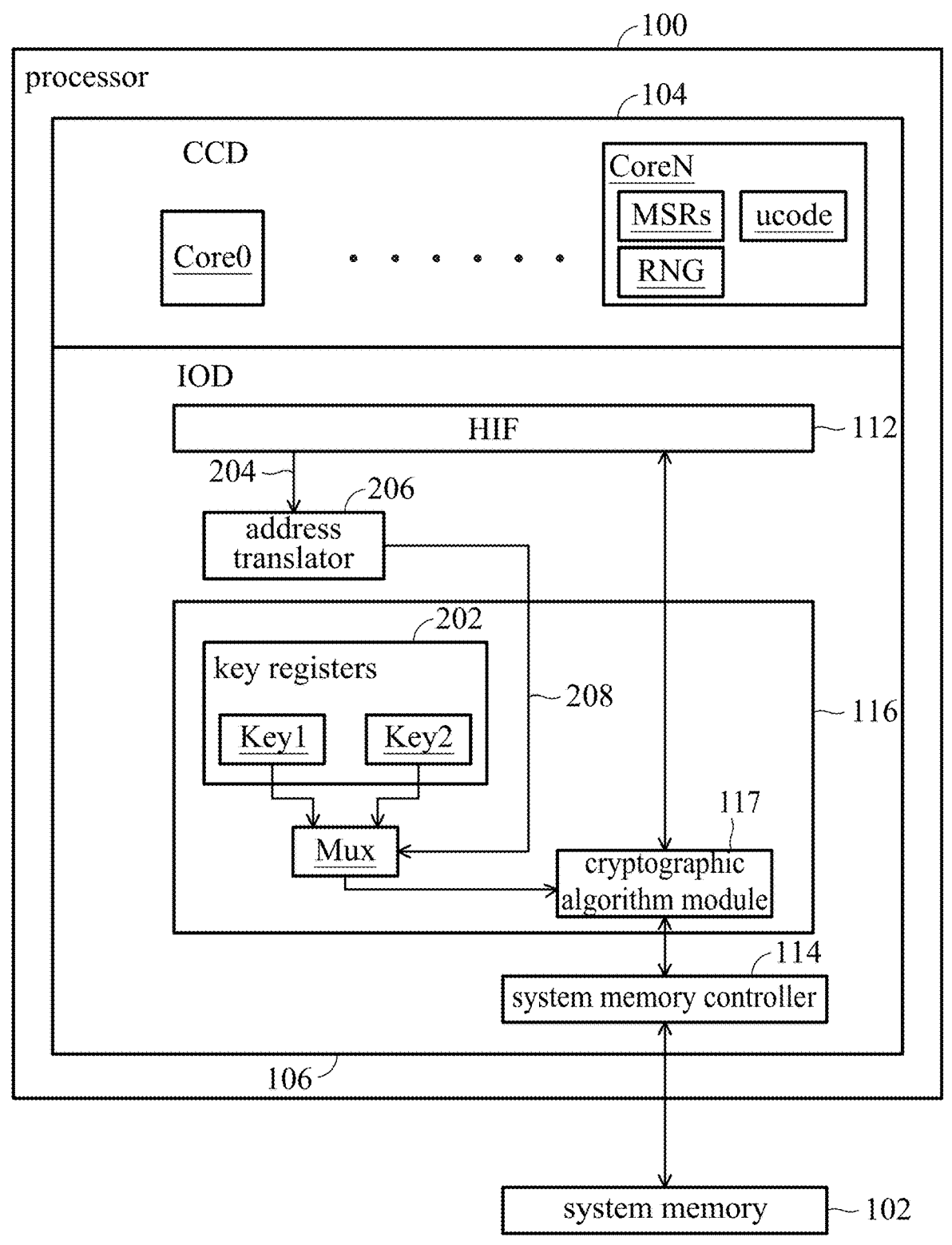
FIG. 2 illustrates implementation details of the processor 100 in accordance with an exemplary embodiment of the disclosure.

The implementation details of the system memory encryption and decryption technology are described below. FIG. 2 illustrates implementation details of the processor 100 in accordance with an exemplary embodiment of the disclosure.

In FIG. 2, each core (CoreN as an example) of the CCD 104 may provide the aforementioned MSRs (including SMED_CAPABILITY, SMED_ACTIVATE, SMED_EXCLUDE_MASK, and SMED_EXCLUDE_BASE). When booting up, the BIOS configures the aforementioned MSRs. The core may further include a random number generator RNG. When the BIOS programs the second bit of the MSR SMED_ACTIVATE to enable the hardware to perform data encryption and decryption on the system memory 102 (for example, setting the value of the second bit of SMED_ACTIVATE to 1), the core operates the microcode unit ucode. The microcode unit ucode operates the random number generator RNG to generate keys Key1 and Key2 to be alternately adopted according to the access address on the system memory 102. The microcode unit ucode transfers the generated keys Key1 and Key2 to the key registers 202 of the IOD 106 for storage. Corresponding to the cryptographic algorithm of the XTS mode (for example, AES-XTS 128, or AES-XTS 256 cryptographic algorithm), each of the generated keys Key1 and Key2 is further divided into a first part and a second part for use; that is, the key Key1 contains two key values, and the key Key2 contains the other two key values.

In another exemplary embodiment, the random number generator RNG is provided within the IOD 106. When the BIOS programs the second bit of the MSR SMED_ACTI-VATE to enable the hardware to perform data encryption and decryption on the system memory 102 (for example, setting the value of the second bit of SMED_ACTIVATE to 1), the IOD 106 operates its own random number generator RNG to generate the keys Key1 and Key2, and stores the generated keys Key1 and Key2 in the key registers 202. In short, it does not intend to limit the location of the random number generator RNG.

According to design requirements, the key registers 202 may contain more than two keys. This application does not intend to limit the number of keys stored in the key registers 202.

The DRAM controller 114_1 and the NVRAM controller 114_2 in FIG. 1 are collectively referred to as the system memory controller 114 in FIG. 2. The system memory controller 114 operates the encryption and decryption engine 116 to implement data encryption and decryption on the system memory 102. The cryptographic algorithm modules 117_1 and 117_2 in FIG. 1 are collectively referred to as a cryptographic algorithm module 117 in FIG. 2. The cryptographic algorithm module 117 selects a key from the two keys Key1, Key2 (or more keys) stored in the key registers 202. After the core completes the virtual address (VA) to physical address (PA) conversion for accessing the system memory 102, the HIF 112 hands over the physical address (PA) 204 to the address translator 206 to be translated into a row address and a column address that the system memory 102 can interpret. The address translator 206 generates a key selection signal 208 based on the generated row address and/or column address. In an exemplary embodiment, the key selection signal 208 is a specific address bit of the generated column address (or row address), which is applied to control the multiplexer Mux, so that the multiplexer Mux provides the cryptographic algorithm module 107 with the key Key1 or the key Key2, as the target key for encryption of write data or decryption of read data. In another exemplary embodiment, the key selection signal 208 is N specific address bits of the generated column address (or row address), and the key registers 202 contain $2^N$ keys, where N is a number. The key selection signal 208 is used to control the multiplexer Mux, so that the multiplexer Mux outputs one of $2^N$ keys to the cryptographic algorithm module 117 as the target key for encryption of write data or decryption of read data. In another exemplary embodiment, N specific address bits of the generated column address (or row address) are transformed into an M-bit hash value, and the key selection signal 208 is Z specific bits among the M-bit hash value. In this case, the key registers 202 contain 27 keys. The key selection signal 208 is applied to control the multiplexer Mux, so that the multiplexer Mux outputs one of the 27 keys to the cryptographic algorithm module 117 for encryption of write data or decryption of read data.

In an exemplary embodiment, the row address and column address generated by the address translator 206 are sent to the system memory controller 114. The system memory controller 114 reads from or writes to the received row address and column address in the system memory.

The key registers 202 and the multiplexer Mux implement the key providers 118_1 and 118_2 of FIG. 1. In an exemplary embodiment, the address translator 206 and the encryption and decryption engine 116 may be functional modules which have been incorporated into the system memory controller 114.

In an exemplary embodiment, the encryption and decryption engine 116 does not manage a key table to store keys. Based on performance considerations, to access a device space in the system memory 102 with a data length less than 128 bits (16B) (that is, an access to a peripheral space that may include read-modified-write steps), the encryption and decryption engine 116 may be combined into a pipeline structure of the system memory controller 114. The encryption and decryption engine 116 includes two key registers, for storage of keys Key1 and Key2, respectively. The encryption and decryption engine 116 selects the target key from the keys according to the access address on the system memory 102. For example, if the target key is selected according to the $13^{th}$ bit of the access address, the target key is changed every 4K of the system memory 102. If the first bit of the MSR SMED_ACTIVATE is locked (for example, the value of the first bit of SMED_ACTIVATE is 1), the keys Key1 and Key2 stored in the key registers are not allowed to be rewritten.

FIG. 3 further illustrates the key supply process of the processor 100 in FIG. 2. In step S302, the HIF 112 sends the physical address (PA) 204 that is pertinent to the read or write operation of the system memory 102 to the address translator 206. Specifically, the HIF 112 first determines whether the physical address (PA) 204 falls into the encryption-free and decryption-free zone. If yes, the HIF 112 instructs the cryptographic algorithm module 117 not to encrypt write data nor decrypt read data at the physical address 204. If the judgment result is that the physical address 204 does not fall into the encryption-free and decryption-free zone, step S304 is performed.

In step S304, the address translator 206 generates a key selection signal 208 according to the received physical address (PA) 204. Specifically, the address translator 206 translates the received physical address (PA) 204 into a row address and a column address that the system memory 102 can interpret. Then, the key selection signal 208 is generated based on the generated column address (or row address). As for the details of the generation of the key selection signal 208, they have been described above and will not be described again here.

In step S306, the multiplexer Mux selects the target key to the cryptographic algorithm module 117 according to the key selection signal 208. As for how the multiplexer Mux selects the target key according to the key selection signal 208, it has been described above and will not be described again here.

In step S308, the cryptographic algorithm module 117 performs data encryption and decryption on the system memory 102 according to the received target key. Specifically, the cryptographic algorithm module 117 uses the target key output from the multiplexer Mux to perform the cryptographic algorithm indicated by the first sector of the MSR SMED_ACTIVATE, to decrypt the data read from system memory 102 or to encrypt the data written into the system memory 102.

In addition to the processor 100, the computer system introduced above may also include the system memory 102. Any electronic device that uses the above processor 100 to encrypt and decrypt the system memory 102 involves the technology of the disclosure. In this disclosure, a system memory encryption and decryption method is also developed based on the above concepts and is applied to computer systems.

Figure 4:
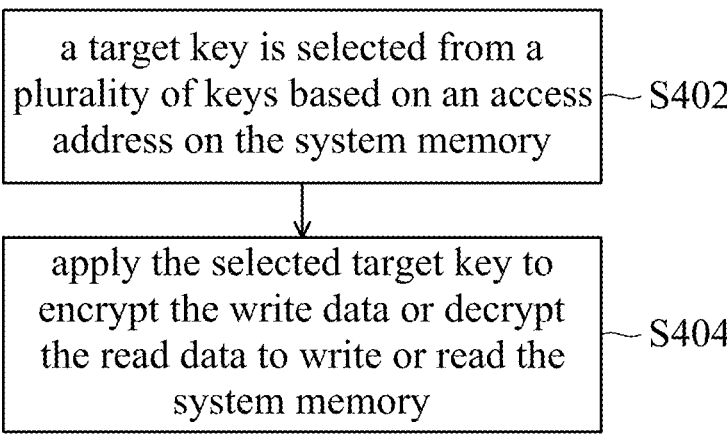
FIG. 4 is a flow chart illustrating a method for data encryption and decryption on the system memory 102 in accordance with an exemplary embodiment of the disclosure.

FIG. 4 is a flow chart illustrating a method for data encryption and decryption on the system memory 102 in accordance with an exemplary embodiment of the disclosure. In step S402, a target key is selected from a plurality of keys based on an access address on the system memory. Specifically, the processor converts a virtual address issued to read/write the system memory 102 to a physical address. The address translator 206 generates a key selection signal 208 based on the received physical address (PA) 204 (see the above description of step S304 in FIG. 3 for details). The multiplexer Mux then selects the target key from the key registers 202 based on the key selection signal 208.

In step S404, the selected target key is applied to encrypt the write data or decrypt the read data to write or read the system memory. Specifically, the cryptographic algorithm module 117 uses the target key to encrypt write data and decrypt read data for the system memory.

While the disclosure has been described by way of example and in terms of the preferred embodiments, it should be understood that the disclosure is not limited to the disclosed embodiments.

What is claimed is:

1. A computer system, comprising:

a system memory, configured to store data; and a processor, coupled to the system memory;

wherein:

the processor includes key registers storing a plurality of keys;

the processor selects a target key from the key registers based on an access address on the system memory, to apply the target key to perform data encryption and decryption on the system memory; and the processor further comprises:

a first model-specific register, configured to indicate that setting of an encryption-free and decryption-free zone is supported;

a second model-specific register; and a third model-specific register and a fourth model-specific register, respectively configured to set a mask and a base address of the encryption-free and decryption-free zone;

wherein the second model-specific register is configured to lock the second model-specific register itself, and also to lock the third model-specific register and the fourth model-specific register for security of the encryption-free and decryption-free zone.

2. The computer system as claimed in claim 1, wherein the processor includes:

a system memory controller, configured to access the system memory;

an encryption and decryption engine, running a cryptographic algorithm to encrypt write data in response to a write operation that the system memory controller performs on the system memory, and to decrypt read data in response to a read operation that the system memory controller performs on the system memory, wherein the encryption and decryption engine includes a key provider, wherein the key provider retrieves the target key from the key registers according to at least one specific address bit of the access address, and passes the target key to the encryption and decryption engine to run the cryptographic algorithm based on the target key.

3. The computer system as claimed in claim 2, wherein: the cryptographic algorithm is an SM4 block information cipher algorithm in XTS mode; and each key is divided into a first part and a second part for use.

4. The computer system as claimed in claim 2, wherein:

the first model-specific register is further configured to present candidates to be selected as the cryptographic algorithm, and indicate that the data encryption and decryption on the system memory is supported; and the second model-specific register is further configured to select the cryptographic algorithm from the candidates, and enable the encryption and decryption engine to perform the data encryption and decryption on the system memory.

5. The computer system as claimed in claim 2, wherein:

a core of the processor converts a virtual address of the write data and the read data into a physical address; and the processor further comprises an address translator that translates the physical address into an identification address on the system memory, and retrieves the target key from the key registers according to the specific address bit of the identification address to run the cryptographic algorithm based on the target key.

6. The computer system as claimed in claim 5, wherein: the processor comprises a host interconnect fabric that receives the physical address from the core of the processor for delivery to the address translator.

7. The computer system as claimed in claim 5, wherein:

the system memory recognizes a row address and a column address; and the identification address is at least one of the row address and the column address.

8. The computer system as claimed in claim 7, wherein:

the processor comprises a multiplexer, which retrieves the target key from the key registers according to the specific address bit of the column address to run the cryptographic algorithm based on the target key.

9. The computer system as claimed in claim 1, wherein:

the processor selects the target key from the key registers based on at least one specific address bit of the access address;

when one specific address bit is adopted, the number of keys is 2; and when more than one specific address bit is adopted, the number of keys is $2^N$, where N is the number of specific address bits.

10. The computer system as claimed in claim 1, wherein:

the processor includes a random number generator that generates and stores the keys in the key registers.

11. A method for system memory encryption and decryption, comprising:

selecting a target key from a plurality of keys based on an access address on a system memory;

applying the target key to perform data encryption and decryption on the system memory;

providing a first model-specific register configured to indicate that setting of an encryption-free and decryption-free zone is supported;

providing a second model-specific register; and providing a third model-specific register and a fourth model-specific register, respectively configured to set a mask and a base address of the encryption-free and decryption-free zone;

wherein the second model-specific register is configured to lock the second model-specific register itself, and also to lock the third model-specific register and the fourth model-specific register for security of the encryption-free and decryption-free zone.

12. The method as claimed in claim 11, further comprising:

converting a virtual address issued to access the system memory into a physical address;

translating the physical address into an identification address on the system memory; and retrieving the target key according to a specific address bit of the identification address to apply the target key to perform data encryption and decryption on the system memory.

13. The method as claimed in claim 12, wherein:

the system memory recognizes a row address and a column address; and the identification address is at least one of the row address and the column address.

14. The method as claimed in claim 11, wherein:

when one specific address bit of the access address is adopted to select the target key from the plurality of keys, the number of keys is 2; and when more than one specific address bit of the access address is adopted to select the target key from the plurality of keys, the number of keys is $2^N$, where N is the number of specific address bits.

* * * * *